J. A. MILLER.
Saw-Sharpening Machine.

No. 164,470.  Patented June 15, 1875.

Witnesses:

John A. Miller
Inventor.

UNITED STATES PATENT OFFICE.

JOHN A. MILLER, OF OSHKOSH, WISCONSIN.

IMPROVEMENT IN SAW-SHARPENING MACHINES.

Specification forming part of Letters Patent No. 164,470, dated June 15, 1875; application filed September 4, 1874.

*To all whom it may concern:*

Be it known that I, JOHN A. MILLER, of the city of Oshkosh, in the county of Winnebago and State of Wisconsin, have invented certain Improvements in Saw-Sharpening Machines, of which the following is a specification:

The object of my invention is to bring a saw of any form—either circular or long—of any possible size or shape of tooth, into any required position with reference to the grinding-wheel, and to hold it firmly in place while it is being ground. I further aim, by mechanical devices, to give any required shear to the teeth, and so that they shall be perfectly uniform and true, as they cannot be if any portion of that operation is performed by mere manual dexterity. By one of the devices in this combination I am also enabled to turn the saw away from the grinding-wheel for the purpose of setting, swaging, &c., without removing it from the machine or using a bench. I further aim, by a peculiar combination of cams and levers, to raise the saw to the wheel during the process of grinding, instead of bringing the wheel to the saw, as in other machines. The wheel-frame is movable, and may be used in the usual manner; but I prefer to use it in combination with an adjusting-arc and set-screw, by which it is brought to any desired height and fastened, and the levers before referred to employed to raise and lower the saw during the process of grinding. I further make use of an independent reversible collar for holding the grinding-wheel, so as to secure increased service from each wheel by using the opposite sides alternately.

Figure 1:
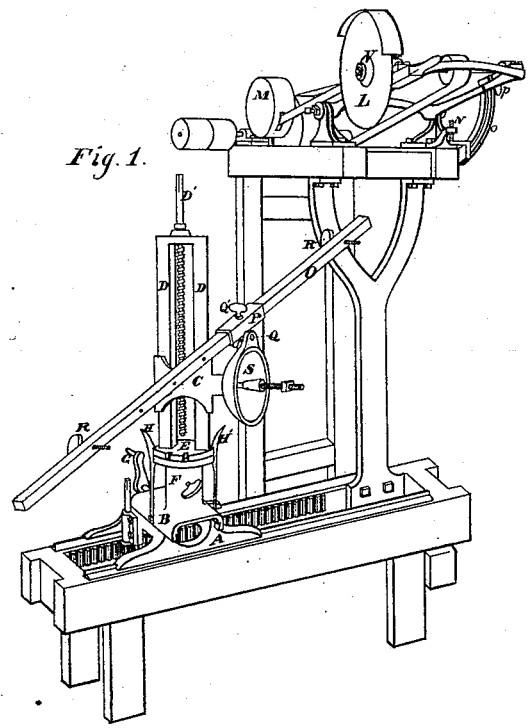
Figure 2:
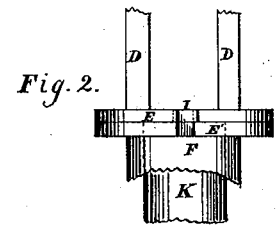
Figure 3:
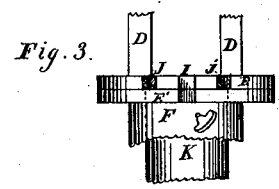
Figure 4:
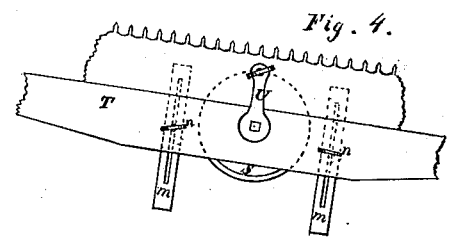
Figure 5:
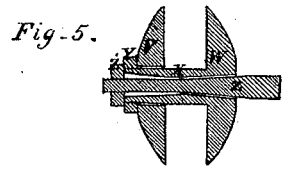
Figure 7:
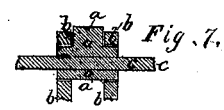
Figure 6:
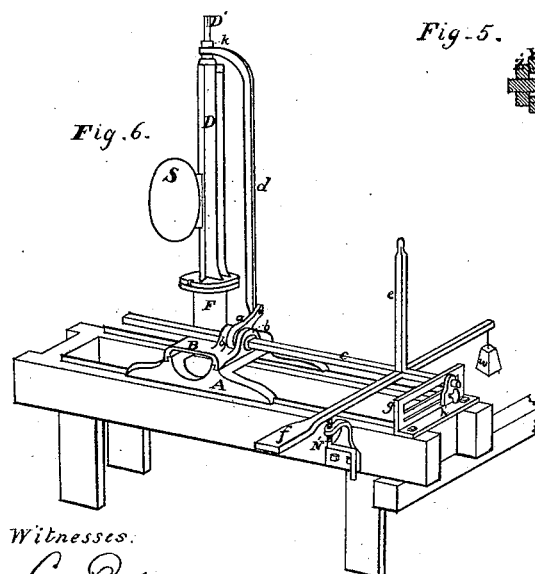
Figure 8:

Figure 1 is a perspective view of the machine without the lever attachment. Fig. 2 is a detached elevation of that portion by means of which the shear for slitting saws is given. Fig. 3 is another elevation of the same, showing the devices for giving shear to cross-cut saws. Fig. 4 shows the manner of attaching cross-cut or drag saws to the machine. Fig. 5 is a section of the reversible collar. Fig. 6 is a detached sketch, showing the lever attachment. Fig. 7 is a section of a cam used in the same. Fig. 8 is an elevation of a movable collar for holding one end of the horizontal bar.

A is a horizontal carrier. B is a carrier moving transversely on A. Cast solid with A is a hollow upright shaft, F, provided at its top with a flange or disk, E'. E is a corresponding disk, cast on K, which is set into the hollow shaft F. D D are vertical guides, also cast solid with E, and along which the saw-bearing carrier C is moved by the screw D'. S is a bowl-shaped friction-plate, provided with a central spindle, on which the saw is slipped and held to the plate by a nut. P is a long loop or thimble, hinged to the edge of the friction-plate, and held at any angle by a set-screw, Q. O is an arm, passing through P, and held at any point by a set-screw, Q', and provided with bearing-screws R and R', which bear against the saw while grinding, to prevent vibration, and thus secure a perfect tooth. L is the grinding-wheel, represented in a movable frame. M is a counter-weight, for raising the wheel-frame while in use when the machine is used without the lever attachment; and N is an adjustable stop, for regulating the drop of the wheel. *o* is a slotted arc, with set-screw *p*, for adjusting the wheel-frame at any desired height. This arc may be attached either to the wheel-frame or the main upper frame of the machine. I and I', J and J' are slots in the disks E and E', for regulating the angle of the saw to the grinding-wheel, and securing the requisite shear to the teeth, as will be hereafter more fully described. H and H' are spring-stops, for locking the disks E and E' together, by means of the slots aforesaid. The same office may be performed by pins set in holes through the disks. *c* is a longitudinal, angular, or key-seated rod, passing freely through a cam, *a*, set between ears *b b*, cast on the carrier B. *h* is a movable collar, for holding the journal turned on the end of *c*. It is set on a double-slotted plate, *g*, set parallel with the carrier B, and moves transversely as the carrier moves, being set in any position by a clamp and set-screw, *i*. *d* is a lifting-rod, hinged to the cam *a*, and bent at right angles at its top, and having a collar slipped on D', above which is a nut, *k*, against which it bears in lifting D', and with it the saw-bearing carrier C. W is one flange of the wheel-holding collar, cast solid with the hollow shaft X. V is the independent flange, slipped onto X, and pressed to the wheel by the nut Y. The arbor-box in X is in the form of a double truncated cone, decreasing in size from each end toward the middle, so that it can be shipped from either side onto the truncated arbor Z, and tightened by the nut Z'.

The saw is slipped on the spindle and against the friction-plate S. The disks E and E' being locked in the position shown in Fig. 3, the saw is at right angles with the grinding-wheel, which always maintains its vertical square position. The combination of the carriers A, B, and C will bring the saw in any desired position. The set-screw Q is loosened and the arm O is slipped through P until the screw R bears against the saw at its point of contact with the wheel. Q and Q' are then tightened, and the arm O left in position. If the machine is used without the lever attachment, the set-screw $p$ is loosened, and the frame is borne down, bringing the wheel to the saw. If the lever attachment is used, the wheel-frame is fastened at any desired height by tightening the set-screw $p$, and then, by means of the lever $e$ or treadle $f$, the saw is raised to the wheel, the lift being gaged by an adjustable stop, N', the weight $w$ assisting to bring the lever back. The saw being at right angles to the wheel, the front of the tooth is now ground. To give the shear to a slitting-saw, the spring (or pin) is disengaged from the slot I, Fig. 3, and the slots on the opposite side, Fig. 2, are used. The slot I in disk E is just so much wider each side of the center than the slot in disk E', as will give the requisite shear to the saw. The position indicated by the full lines gives shear for one-half of the teeth, and that indicated by the dotted lines gives shear to the other half, the disks being clamped in either position by a set-screw in F.

To give shear to a cross-cut saw, the slots J and J', Fig. 3, are used. The disk E being turned till the slot E' is locked with J, gives shear for one-half of the teeth, and being turned till it is locked with J' gives shear for the other half.

Long saws are placed on a supporting-arm, T, Fig. 4, to which they are attached by adjustable bearing-arms $m\ m$, provided with set-screws $n\ n$, and the arm slipped onto the central spindle, on which it turns, thereby giving any desired angle with the grinding-wheel. By the combination with the carriers A, B, and C, I can now bring the saw to any desired position with reference to the grinding-wheel. By the pivotal motion of the arm T on the central spindle I can get any desired angle, and by means of the mutual adjustment and interlocking of the disks E and E' by the latch H and slots I I' J J', I secure the required angle between the carriers B and C, that will give the necessary shear to the tooth.

Having thus described my invention, what I claim as new, and desire to secure by Letters Patent, is—

1. The combination of the horizontal carrier A, transverse carriers B, and vertical carrier C, substantially as shown, for the purposes specified.

2. The combination of the disks E E', constructed with slots I I' and J J', substantially as described, for the purpose specified.

3. The arm O and thimble P, constructed substantially as shown, with set-screws Q and Q', R and R', for the purposes specified.

4. The independent reversible collar W V, constructed substantially as shown, for the purpose of reversing the grinding-wheel of a saw-sharpening machine.

5. The sliding cam $a$, constructed substantially as shown, in combination with the angular or key-seated rod $c$, lifting-bar $d$, movable collar $h$, and slotted plate $g$, substantially as and for the purposes set forth.

JOHN A. MILLER.

Witnesses:
C. PALMER,
S. PALMER.